United States Patent
Harris (10) Patent No.: US 10,627,700 B1
(45) Date of Patent: Apr. 21, 2020

(54) CONFIGURABLE LENS SHIELD

(71) Applicant: Eaton Intelligent Power Limited, Dublin (IE)

(72) Inventor: Christopher John Harris, Hampton, GA (US)

(73) Assignee: Eaton Intelligent Power Limited, Dublin (IE)

( * ) Notice: Subject to any disclaimer, the term of this patent is extended or adjusted under 35 U.S.C. 154(b) by 0 days.

(21) Appl. No.: 16/211,013

(22) Filed: Dec. 5, 2018

(51) Int. Cl.
*G03B 11/04* (2006.01)
*G02B 17/02* (2006.01)
*G02B 7/02* (2006.01)

(52) U.S. Cl.
CPC ............ *G03B 11/04* (2013.01); *G02B 7/026* (2013.01)

(58) Field of Classification Search
None
See application file for complete search history.

(56) References Cited

U.S. PATENT DOCUMENTS

| | | | | |
|---|---|---|---|---|
| 3,715,149 A | * | 2/1973 | Freeland | G03B 11/041 359/611 |
| 2012/0033283 A1 | * | 2/2012 | Halsema | G02F 1/011 359/245 |
| 2013/0051784 A1 | * | 2/2013 | Chang | G03B 11/043 396/448 |
| 2013/0148217 A1 | * | 6/2013 | Yamashita | G02B 7/02 359/827 |
| 2018/0126442 A1 | * | 5/2018 | Rayburn | B21D 51/383 |

* cited by examiner

*Primary Examiner* — William B Perkey
(74) *Attorney, Agent, or Firm* — King & Spalding LLP (57) ABSTRACT

A configurable lens cover configured to be disposed over a lens of a sensor to control an area monitored by a sensor and/or to block light from undesirable directions from striking the lens of the sensor. The configurable lens cover includes a collar that has an inner edge which defines a central opening. Further, the configurable lens cover includes detachable panels that extend angularly and inward towards a central axis and the central opening of the configurable lens cover from the inner edge of the collar. The detachable panels may be partially separated from each other along the side edges and top end of each detachable panel. Furthermore, the configurable lens cover includes perforations formed adjacent a bottom end of each detachable panel that is coupled to each other and the collar. The perforations define a living hinge along which each detachable panel is breakable.

20 Claims, 7 Drawing Sheets

CONFIGURABLE LENS SHIELD

TECHNICAL FIELD

Embodiments of the present disclosure relate generally to luminaires, and more particularly to configurable lens shields for sensors in luminaires.

BACKGROUND

The operation of luminaires can be made more efficient and smarter by using various sensors, such as motion sensors, occupancy sensors, light sensors, etc. In some scenarios, users may desire to limit an area that is monitored by a sensor to prevent false detections or triggering of luminaires controlled by the sensor. For example, in an aisle way or corner that is monitored by a motion sensor, specific locations of motion or light sources may have to be ignored for proper regulation of the luminaires that are controlled by the motion sensor. A lens shield may be coupled to the sensor in the luminaire to limit the area that is monitored by the sensor. However, existing lens shields are pre-shaped to limit an area monitored by a sensor to a fixed shape and size (herein 'pattern'). That is, said existing lens shields are not configurable to change the pattern of the area monitored by the sensor as desired by the user, thereby requiring multiple lens shields, each being pre-shaped to limit the area monitored by the sensor to a different pattern. Multiple lens shields for obtaining different patterns of area monitored by the same sensor increases the stock keeping units (SKUs). Further, each time the pattern of an area monitored by a sensor and limited by a lens shield has to be changed or altered, the lens shield has to be removed and replaced with another lens shield. Changing between different lens shields each time a user desires a different pattern of area to be monitored by the sensor may be inconvenient to the user.

This background information is provided to reveal information believed to be of possible relevance to the present disclosure. No admission is necessarily intended, nor should be construed, that any of the preceding information constitutes prior art against the present disclosure.

SUMMARY

In one aspect, the present disclosure relates to a configurable lens shield that includes an annular collar extending from an outer edge to an inner edge and detachable panels that extend angularly towards a central axis of the configurable lens shield from the inner edge of the collar and into a central opening defined by the inner edge of the annular collar. The detachable panels collectively define an inner cavity that is configured to receive a detection surface of a sensor therein.

In another aspect, the present disclosure relates to a lens cover that includes an outer ring and detachable panels that are coupled to the outer ring by a living hinge that is breakable to remove the detachable panels from the outer ring. The detachable panels collectively define an inner cavity that is configured to receive a lens of a sensor.

These and other aspect, objects, features, and embodiments, will be apparent from the following description and the appended claims.

BRIEF DESCRIPTION OF THE FIGURES

The foregoing and other features and aspects of the present disclosure are best understood with reference to the following description of certain example embodiments, when read in conjunction with the accompanying drawings, wherein.

The drawings illustrate only example embodiments of the present disclosure and are therefore not to be considered limiting of its scope, as the present disclosure may admit to other equally effective embodiments. The elements and features shown in the drawings are not necessarily to scale, emphasis instead being placed upon clearly illustrating the principles of the example embodiments. Additionally, certain dimensions or positions may be exaggerated to help visually convey such principles.

DETAILED DESCRIPTION OF EXAMPLE EMBODIMENTS

In the following paragraphs, a configurable lens shield will be described in further detail by way of examples with reference to the attached drawings. In one example, the configurable lens shield may be a single integral unit that includes a collar and a plurality of detachable panels that coupled to the collar by a living hinge that is breakable. The configurable lens unit is adapted to fit over the lens of a sensor without creating a significant gap therebetween. Each detachable panel of the configurable lens shield may be removable to control an area monitored by a sensor or to block light from undesirable directions from striking a sensor detection surface, such as a lens of the sensor.

In the following description, well-known components, methods, and/or processing techniques are omitted or are briefly described so as not to obscure the disclosure. As used herein, the "present disclosure" refers to any one of the embodiments of the disclosure described herein and any equivalents. Furthermore, reference to various feature(s) of the "present disclosure" is not to suggest that all embodiments must include the referenced feature(s).

Figure 1:
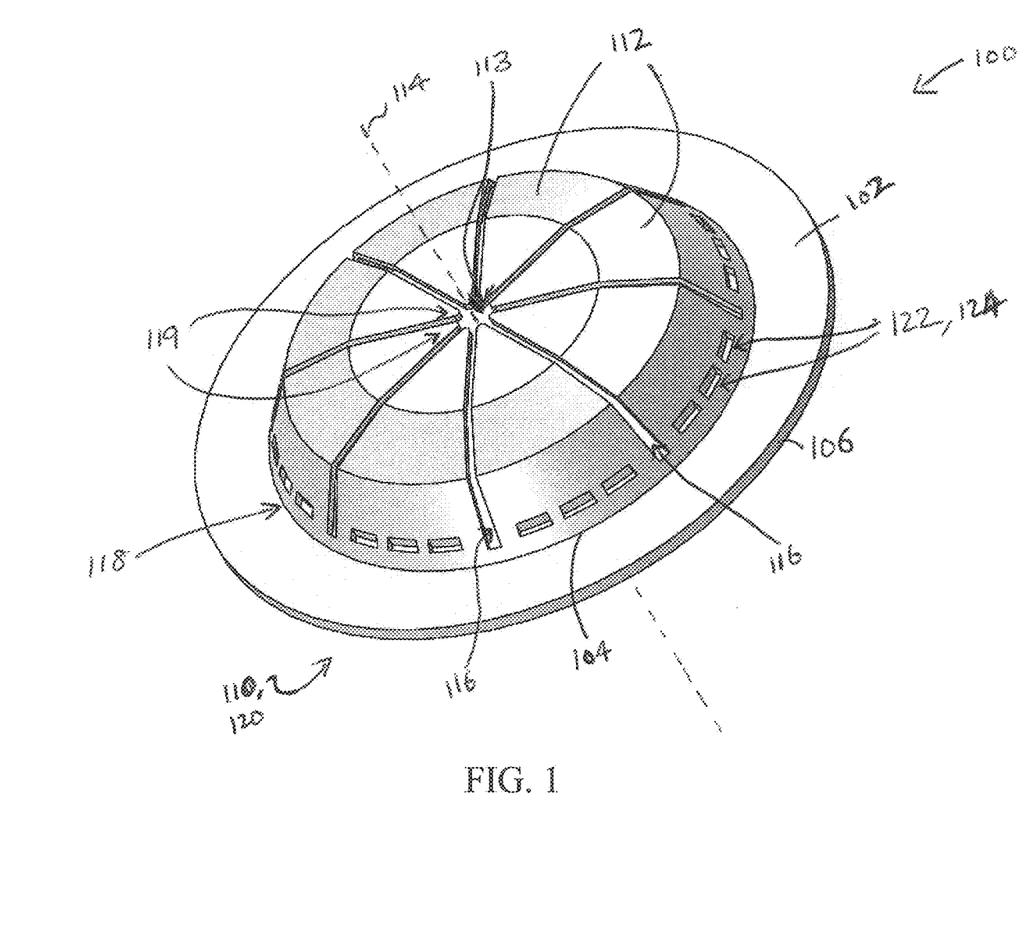
FIG. 1 illustrates a top perspective view of a first example configurable lens shield, in accordance with example embodiments of the present disclosure.
Figure 2:
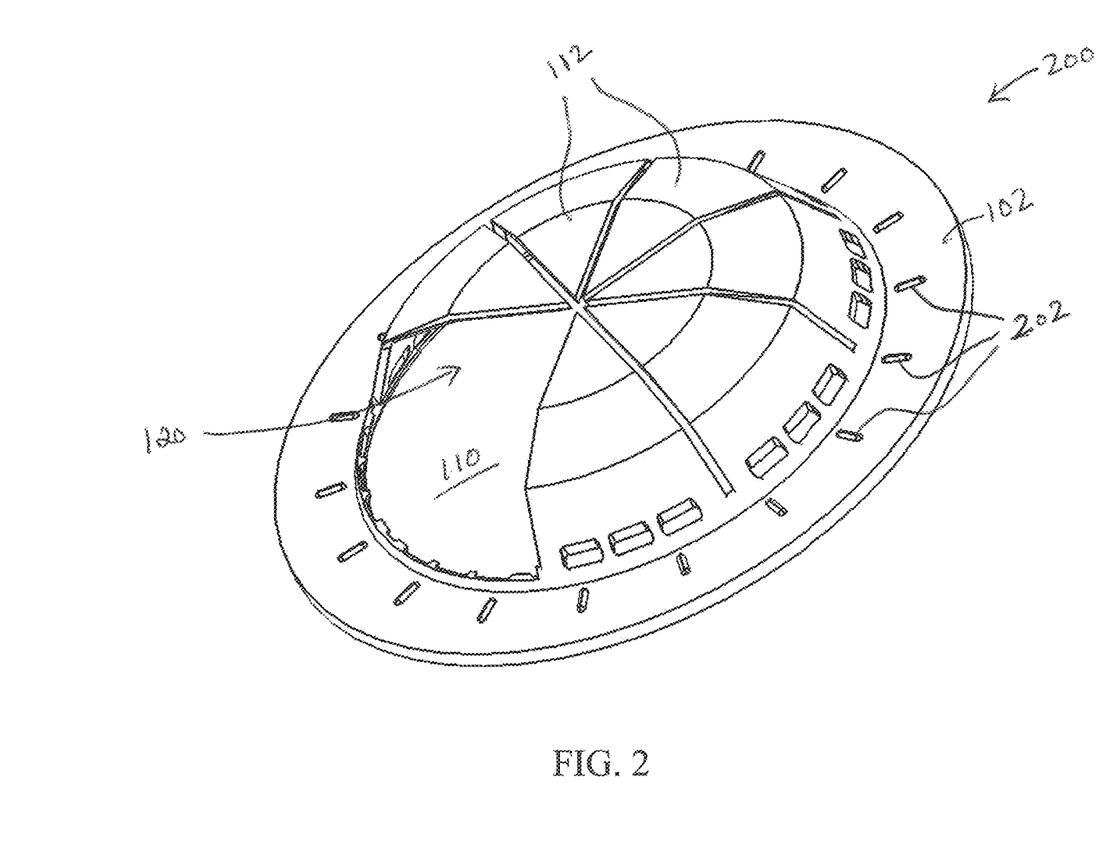
FIG. 2 illustrates a top perspective view of a second example configurable lens shield with one or more detachable panels removed therefrom, in accordance with example embodiments of the present disclosure.
Figure 3:
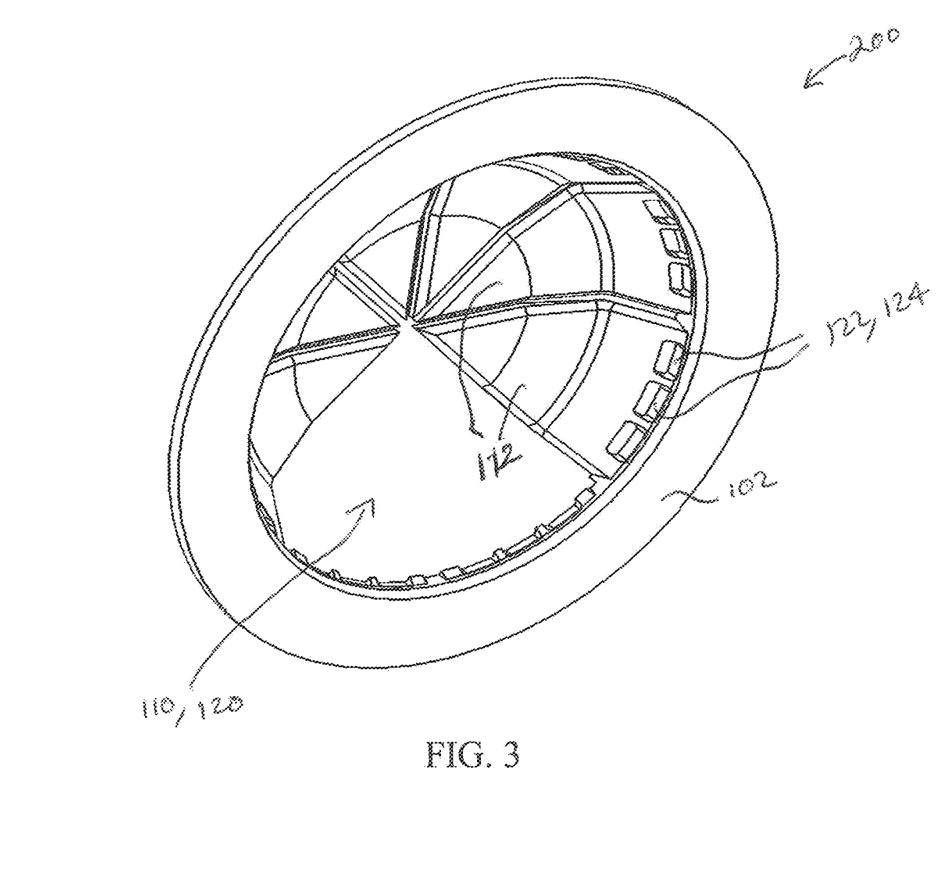
FIG. 3 illustrates a bottom perspective view of the second example configurable lens shield of FIG. 2, in accordance with example embodiments of the present disclosure.
Figure 4:
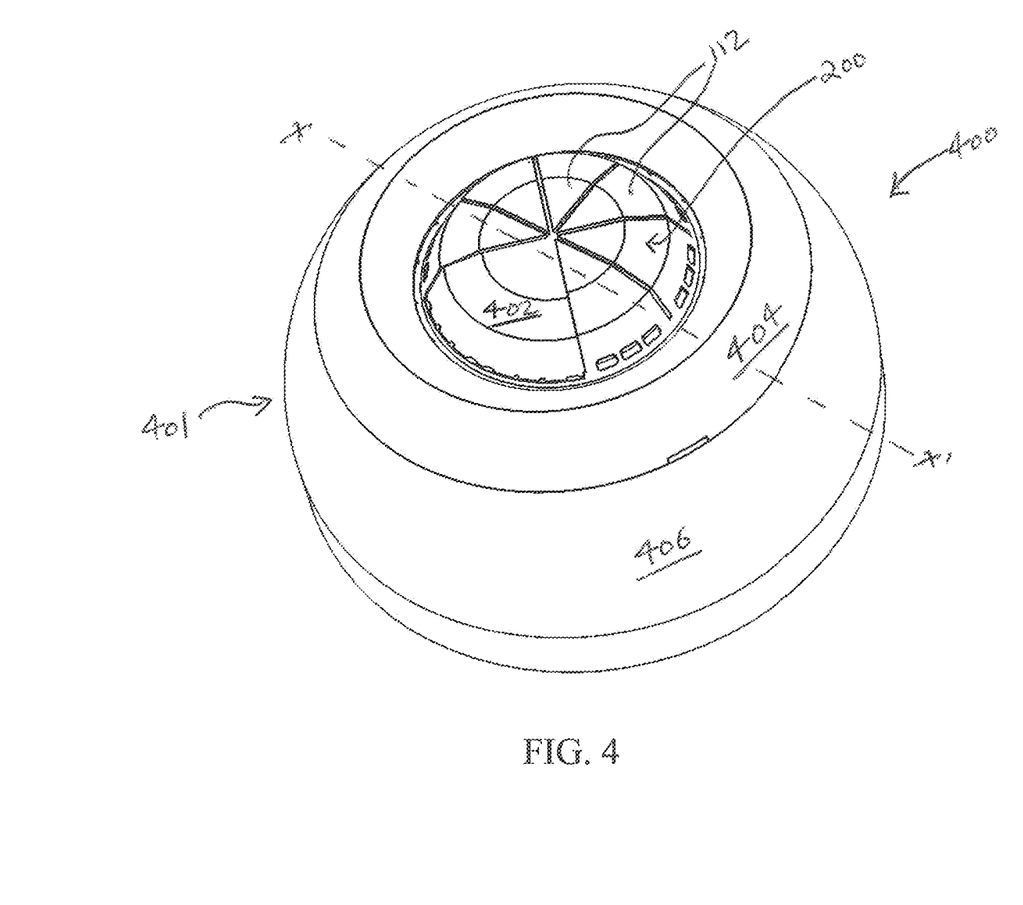
FIG. 4 illustrates a perspective view of a sensor unit with the second example configurable lens shield of FIG. 2 disposed therein, in accordance with example embodiments of the present disclosure.
Figure 5:
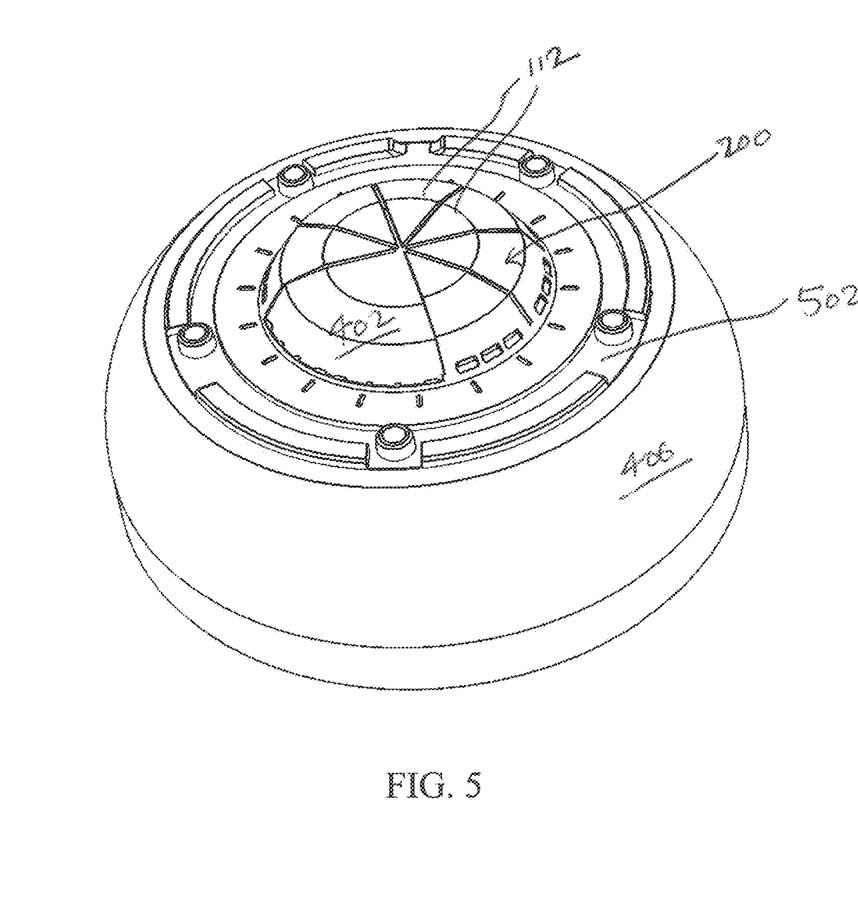
FIG. 5 illustrates a perspective view of the sensor unit of FIG. 4 without the sensor cap coupled thereto and the second example configurable lens shield disposed therein, in accordance with example embodiments of the present disclosure.
Figure 6:
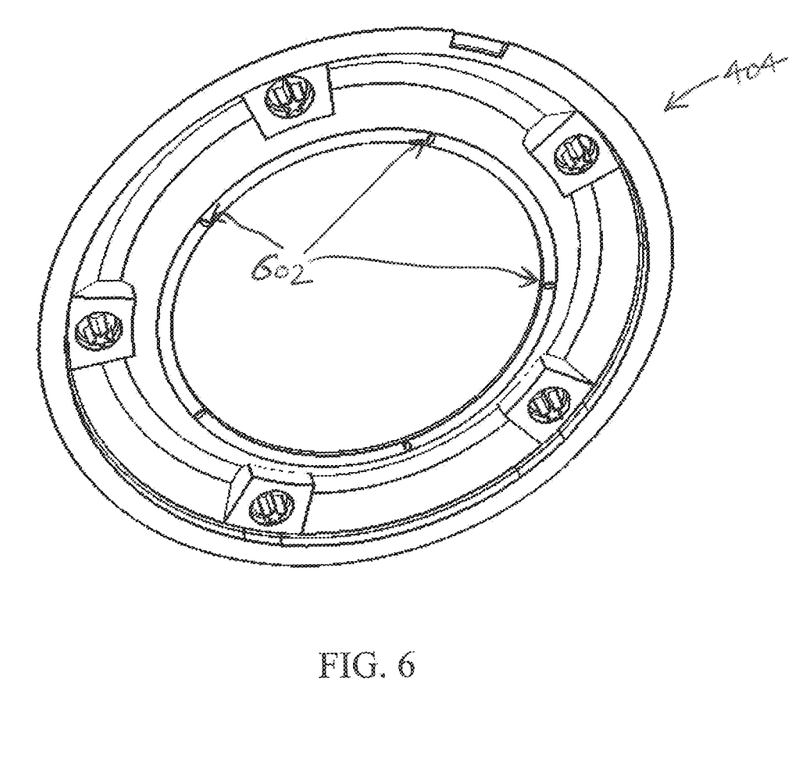
FIG. 6 illustrates a bottom perspective view of the sensor cap of the sensor unit of FIG. 4, in accordance with example embodiments of the present disclosure.

Moving now to discuss the figures, FIGS. 1-7 illustrate example embodiments of the configurable lens shield. In particular, FIG. 1 illustrates a top perspective view of a first example configurable lens shield. Referring to FIG. 1, the first example configurable lens shield 100 may include a collar 102 that is substantially ring shaped. The collar 102 may include an inner annular edge 104 and an outer annular edge 106. The inner annular edge 104 may define a central opening 110. Further, the configurable lens shield 100 may include detachable panels 112 that extend angularly and inward towards a central axis 114 of the configurable lens shield 100 from the inner annular edge 104 of the collar 102. Each detachable panel 112 may taper from the inner annular edge 104 of the collar 102 towards the central axis 114, i.e., from a bottom end 118 of the detachable panel 112 to the top end 119 of the detachable panel. The plurality of detachable panels 112 may be partially detached from each other by slits 116 formed on either sides of each detachable panel 112. Each slit 116 may extend from the central aperture 113 that is adjacent the top ends 119 of the detachable panels 112 towards the inner annular edge 104 of the collar 102. The bottom ends 118 of the detachable panels 112 may be coupled to each other and the inner annular edge 104 of the collar 102.

Figure 7:
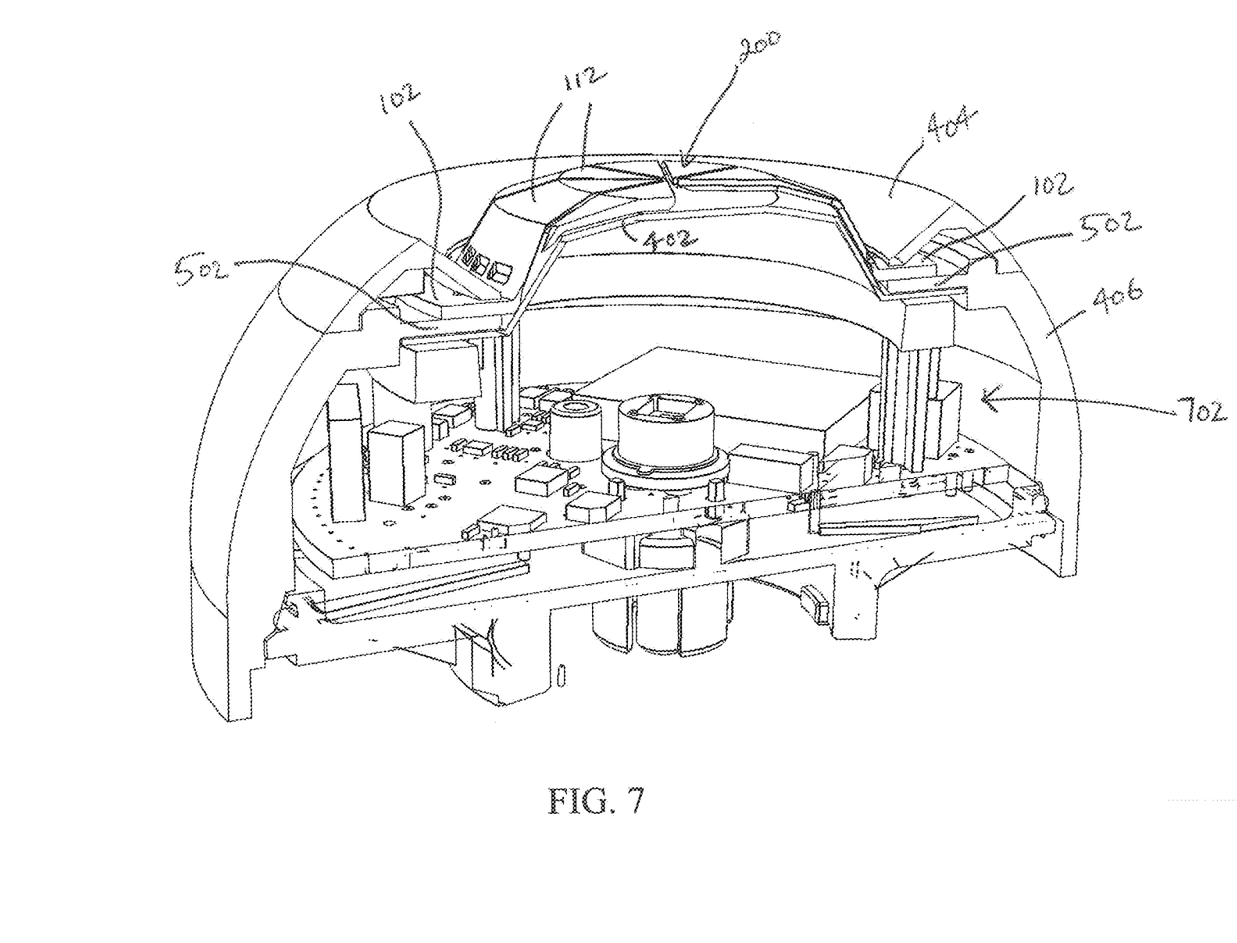
FIG. 7 illustrates a cross-sectional view of the sensor unit of FIG. 4 along an X-X' plane with the second example configurable lens shield disposed therein, in accordance with example embodiments of the present disclosure.

As illustrated in FIG. 1, each detachable panel 112 may have a curved shape and may be configured such that collectively the detachable panels 112 form a dome shape and define a substantially hemispherical inner cavity 120 that is configured to receive a detection surface of a sensor, such as a lens 402 of the sensor 702 (shown in FIG. 7). Further, the configurable lens shield 100 may include perforations 122 formed adjacent the bottom ends 118 of each detachable panel 112. The perforations 122 define a living hinge 124 along which each detachable panel 112 is removable or breakable. In particular, each detachable panel 112 may be removed or broken off from the configurable lens shield 100 by bending the detachable panel 112 until fatigue causes material failure along the living hinge 124 and thereby allowing the detachable panel 112 to separate from a remainder of the configurable lens shield 100. In other words, the detachable panels 112 can be toollessly removed by a user by bending the detachable panel 112 till the detachable panel 112 breaks along the living hinge 124 and then pulling to tear off the detachable panel 112 from the remainder of the configurable lens shield 100 along the living hinge 124.

In alternate embodiments of configurable lens shields, there can be a plurality of detachable panels 112, but only certain of the detachable panels 112 have perforations 122 along the bottom ends 118. In other words, the configurable lens shield can have a first panel that is not detachable, a second panel with perforations that is detachable, and a third panel with perforations that is detachable. In yet other alternate embodiments, the numbers of panels and the numbers of detachable panels can be varied.

FIGS. 2-5 illustrate a second example configurable lens shield 200 with two of the detachable panels 112 broken off or removed. The second example configurable lens shield 200 is substantially similar to the first example configurable lens shield 100 of FIG. 1, except that the second example configurable lens shield 200 may include a plurality of dial ridges 202 formed on the collar 102 at 15 degree or quarter PI angular increments. The dial ridges 202 formed on the collar 102 of the configurable lens shield 200 may be configured to engage corresponding stopper ridges 602 in the sensor housing cap 404 (shown in FIG. 6) to temporarily stop a free rotation of the configurable lens shield 200 and hold the configurable lens shield 200 in a desired position within the sensor 702 (shown in FIG. 7). A user may further twist the configurable lens shield 200 to push the dial ridges 202 past the stop ridges 602 and move the configurable lens shield to a different position. Each time a dial ridge 202 passes over a stopper ridge 602, an audible clicking sound may be created which may aid an end user or technician to precisely adjust the configurable lens shield to a desired position. Further, the dial ridges 202 may aid a technician or end user in determining how many of the detachable panels 112 needs to be broken off from the configurable lens shield 200 for limiting an area monitored by a sensor 702 to a specific pattern. For example, if a 45 degree viewing angle of the sensor 702 is to be opened, then based on the dial ridges 202, the user can determine that only one of the detachable panels 112 needs to be removed. Further, the interaction of the dial ridge 202 with the stopper ridge 602 may be used to adjust the configurable lens shield in quarter PI increments.

As illustrated in FIGS. 4-7, the configurable lens shield 200 is configured to fit over the detection portion, i.e., the lens 402 of the sensor 702 without creating a significant gap therebetween. In particular, the sensor 702 may be housed within a sensor housing assembly 401 of a sensor unit 400 that may include a sensor housing body 406 (herein 'housing body') and a sensor housing cap 404 (herein 'housing cap') that is coupled to the housing body 406. The configurable lens shield 200 may be disposed and held between the housing body 406 and the housing cap 404 such that the configurable lens shield 200 is freely rotatable in a stepwise manner by applying a rotational force. That is, the dial ridges 202 on the collar 102 of the configurable lens shield 200 and the stopper ridges 602 on the housing cap 404 may result in a stepwise free rotation where each time a dial ridge 202 engages the stopper ridge 602, the free rotation of the configurable lens shield 200 may be temporarily stopped, but upon application of a rotational force, the configurable lens shield 200 is further rotatable. In an embodiment of the configurable lens shield where the collar 102 does not have any dial ridges 202 such as the one shown in FIG. 1, the configurable lens shield 200 may be freely rotatable without any temporary stoppages.

In particular, as illustrated in FIGS. 4-7, to couple the configurable lens shield 200 to the sensor unit 400, the configurable lens shield 200 may be disposed on the housing body 406 such that: (a) the collar 102 of the configurable lens shield 200 rests on a shoulder 502 of the housing body 406, and (b) the lens 402 of the sensor 702 is received and fits within the hemispherical inner cavity 120 that is collectively defined by the detachable panels 112 of the configurable lens shield 200. Then, the housing cap 404 may be coupled to the housing body 406 such that the collar 102 of the configurable lens shield 200 is disposed between shoulder 502 of the housing body 406 and the housing cap 404 of the sensor housing assembly 401. In some example embodiments, the sensor unit 400 may be adapted to mate with the configurable lens shield 200 by a snap retention mechanism without departing from a broader scope of the present disclosure. In other words, the configurable lens shield 200 may be configured for toolless installation.

As described above, the configurable lens shield 200 (or 100) may be configured to block or shield light from undesirable areas from striking a detection surface, such as the lens 402 of the sensor unit 400. In the example embodiments illustrated in FIGS. 1-7, the configurable lens shield 200 (or 100) may include eight detachable panels 112 that allow the configurable lens shield 200 (or 100) to be configurable by a sizing of a quarter PI radian angles. Even though the configurable lens shields described herein and illustrated in FIGS. 1-7 include eight detachable panels in an initial state (i.e., before breaking off any detachable panel), one of skill in the art can understand and appreciate that in other example embodiments, the configurable lens shield may include fewer or more detachable panels in the initial state without departing from a broader scope of the present disclosure. The configurable lens shield 200 (or 100) may be formed using any appropriate polymer resin material or a combination of different polymer materials such as, but not limited to, polyethylene, polypropylene, etc. In other example embodiments, the configurable lens shield 200 (or 100) may be formed using any appropriate material that allows the functionality of the configurable lens shield to be maintained, such as having detachable panels that are toollessly removable.

Even though the present disclosure describes the collar 102 of the configurable lens shield 200 (or 100) as being substantially ring shaped, one of skill in the art can understand that in other example embodiments, the collar 102 may have any other appropriate shape that allows either a stepped or continuous free rotation of the configurable lens shield without departing from a broader scope of the present disclosure. For example, the collar 102 may be octagonal. In some examples, the outer edge 106 of the collar 102 may be polygonal while the inner edge 104 may be circular. In other examples, both the inner and outer edges (104, 106) of the collar 102 may be polygonal. Further, even though the present disclosure describes each detachable panel 112 as being curved and having a shape that tapers from one end to the other, one of skill in the art can understand and appreciate that in other example embodiments, the detachable panels may have any other appropriate shape and size without departing from a broader scope of the present disclosure. Furthermore, even though the present disclosure describes the detachable panels as being configured such that they collectively define a hemispherical inner cavity and collectively being shaped like a dome, one of skill in the art can understand and appreciate that in other example embodiments, the detachable panels may be configured to collectively define any other appropriate shape and the inner cavity defined by the detachable panels may have any other appropriate shape without departing from a broader scope of the present disclosure. For example, the shape of the inner cavity that is collectively defined by the detachable panels 112 may be cubical or other appropriate shape based on the shape of the detection surface covered by the detachable panels such that the configurable lens shield and the detachable panels thereof fit over the detection surface without creating a significant gap therebetween.

Additionally, even though the present disclosure describes that the detachable panels are partially separated from each other by the slits formed between the detachable panels, one of skill in the art can understand and appreciate that in other example embodiments, the detachable panels may be separated from each other by any other mechanisms without departing from a broader scope of the present disclosure. For example, in some embodiments, the detachable panels may not be partially detached from each other via the slits 116. Instead, in said example embodiments, the detachable panels may be coupled to each other by score lines along which the detachable panels can be torn to separate them from each other.

Further, even though the present disclosure describes each detachable panel as being removable or broken off as a whole along the living hinge 124 defined by the perforations 122, one of skill in the art can understand and appreciate that in other example embodiments, a portion of each detachable panel may be broken off instead of breaking off the detachable panel as a whole without departing from a broader scope of the present disclosure. For example, each detachable panel 122 may include other living hinges defined within the detachable panel 122 by score lines, perforations, etc., that allow a portion of each detachable panel 122 to be broken off without having to remove the detachable panel as a whole, thereby providing additional control over the area monitored by a sensor or more precise control over blocking light from undesirable directions.

Although the present disclosure is described with reference to example embodiments, it should be appreciated by those skilled in the art that various modifications are well within the scope of the present disclosure. From the foregoing, it will be appreciated that an embodiment of the present disclosure overcomes the limitations of the prior art. Those skilled in the art will appreciate that the present disclosure is not limited to any specifically discussed application and that the embodiments described herein are illustrative and not restrictive. From the description of the example embodiments, equivalents of the elements shown therein will suggest themselves to those skilled in the art, and ways of constructing other embodiments of the present disclosure will suggest themselves to practitioners of the art. Therefore, the scope of the present disclosure is not limited herein.

What is claimed is:

1. A configurable lens shield comprising:
   an annular collar extending from an outer edge to an inner edge, wherein the inner edge defines a central opening; and
   detachable panels that extend angularly towards a central axis of the configurable lens shield and into the central opening from the inner edge of the collar, the detachable panels collectively defining an inner cavity that is configured to receive a detection surface of a sensor therein, wherein each detachable panel of the detachable panels is partially separated from an adjacent detachable panel by a slit.

2. The configurable lens shield of claim 1 further comprising: perforations formed adjacent a bottom end of each detachable panel, wherein the perforations define a living hinge along which the detachable panel is breakable to be removed from the configurable lens shield, and wherein each detachable panel is coupled to the collar at the bottom end.

3. The configurable lens shield of claim 1, wherein each detachable panel tapers from a bottom end to a top end.

4. The configurable lens shield of claim 3, wherein the top ends of the detachable panels are separated from each other.

5. The configurable lens shield of claim 1, wherein the inner cavity that is collectively defined by the detachable panels is substantially hemispherical in shape.

6. The configurable lens shield of claim 1, wherein each detachable panel is curved.

7. The configurable lens shield of claim 1, further comprising: dial ridges disposed on the annular collar and angularly spaced apart from each other.

8. The configurable lens shield of claim 1, wherein the annular collar is substantially ring shaped.

9. A lens cover comprising:
   an outer ring; and
   detachable panels that are coupled to the outer ring by a living hinge that is breakable to remove the detachable panels from the outer ring, wherein the detachable panels collectively define an inner cavity that is configured to receive a lens of a sensor.

10. The lens cover of claim 9, wherein the outer ring comprises dial ridges disposed thereon and angularly spaced apart from each other.

11. The lens cover of claim 9, wherein each detachable panel is curved.

12. The lens cover of claim 9, wherein the living hinge is defined by perforations formed adjacent a bottom end of each detachable panel.

13. The lens cover of claim 9, wherein each detachable panel tapers from a bottom end to a top end.

14. The lens cover of claim 9, wherein each detachable panel of the detachable panels is partially separated from an adjacent detachable panel by a slit.

15. The lens cover of claim 13, wherein the top ends of the detachable panels are separated from each other.

16. The lens cover of claim 9, wherein the inner cavity that is collectively defined by the detachable panels is substantially hemispherical in shape.

17. The lens cover of claim 9, wherein the detachable panels comprise eight detachable panels that cover an angle of 2 PI radians.

18. The lens cover of claim 9, wherein the lens cover is coupled to the sensor such that: (a) the lens of the sensor is disposed in the inner cavity defined by the detachable panels of the lens cover, and (b) the lens cover is freely rotatable.

19. A configurable lens shield comprising:
   an annular collar extending from an outer edge to an inner edge, wherein the inner edge defines a central opening;
   detachable panels that extend angularly towards a central axis of the configurable lens shield and into the central opening from the inner edge of the collar, the detachable panels collectively defining an inner cavity that is configured to receive a detection surface of a sensor therein; and
   perforations formed adjacent a bottom end of each detachable panel of the detachable panels, wherein the perforations define a living hinge along which the detachable panel is breakable to be removed from the configurable lens shield, and wherein each detachable panel is coupled to the collar at the bottom end.

20. The configurable lens shield of claim 19, wherein each detachable panel of the detachable panels is partially separated from an adjacent detachable panel by a slit.

\* \* \* \* \*